United States Patent [19]

Bosman

[11] Patent Number: 5,460,755
[45] Date of Patent: * Oct. 24, 1995

[54] PACKING ELEMENTS, A PACK, A METHOD OF CONSTRUCTING A PACK, AND A METHOD FOR INSTALLING A PACKING IN AN EVAPORATIVE COOLER

[75] Inventor: Peter B. Bosman, Sandton, South Africa

[73] Assignee: T. C. Watermeyer Group, Inc., Transvaal Province, South Africa

[*] Notice: The portion of the term of this patent subsequent to Dec. 13, 2011 has been disclaimed.

[21] Appl. No.: 259,291

[22] Filed: Jun. 13, 1994

Related U.S. Application Data

[63] Continuation-in-part of Ser. No. 115,465, Sep. 1, 1993, Pat. No. 5,372,752.

[30] Foreign Application Priority Data

Jun. 23, 1993 [ZA] South Africa .......................... 93/4518
Jul. 9, 1993 [ZA] South Africa .......................... 93/4967

[51] Int. Cl.⁶ .................................................. B01F 3/04
[52] U.S. Cl. .................... 261/100; 261/106; 261/113; 261/111
[58] Field of Search .................................. 261/100, 106, 261/113, 94, 111, 98, 96

[56] References Cited

U.S. PATENT DOCUMENTS

| | | |
|---|---|---|
| 494,292 | 3/1893 | Dornfeld . |
| 2,047,444 | 7/1936 | Stedman ..................................... 261/94 |
| 2,092,630 | 9/1937 | Bailey . |
| 2,112,041 | 3/1938 | Miller . |
| 2,271,671 | 2/1942 | Wible . |
| 2,470,652 | 5/1949 | Scofield ..................................... 261/95 |
| 2,490,080 | 12/1949 | Melvill . |
| 2,630,305 | 3/1953 | Scofield et al. . |
| 2,808,243 | 10/1957 | Slough et al. . |
| 3,010,706 | 11/1961 | McWilliams .............................. 261/100 |
| 3,031,173 | 4/1962 | Kohl et al. . |
| 3,189,335 | 6/1965 | Fuller et al. . |
| 3,222,040 | 12/1965 | Eckert . |

(List continued on next page.)

FOREIGN PATENT DOCUMENTS

| | | |
|---|---|---|
| 0005535 | 11/1979 | European Pat. Off. . |
| 0058797 | 4/1983 | European Pat. Off. . |
| 0250061 | 12/1987 | European Pat. Off. . |
| 520277 | 6/1921 | France . |
| 745073 | 2/1933 | France ..................................... 261/113 |
| 869527 | 2/1942 | France . |
| 1316211 | 4/1963 | France . |
| 2027505 | 10/1970 | France . |
| 2180117 | 11/1973 | France . |
| 475110 | 4/1929 | Germany . |
| 46-26321 | 7/1971 | Japan . |
| 709108 | 1/1980 | U.S.S.R. . |
| 0775609 | 10/1980 | U.S.S.R. ..................................... 261/111 |
| 316393 | 8/1929 | United Kingdom ..................... 261/113 |
| 996465 | 6/1965 | United Kingdom . |
| 2046623 | 11/1980 | United Kingdom . |
| 2061127 | 5/1981 | United Kingdom . |

OTHER PUBLICATIONS

Copy of European Search Report dated Jan. 27, 1995 (3 pages), Application No. EP 94 30 3970.

Primary Examiner—Tim R. Miles
Attorney, Agent, or Firm—Harness, Dickey & Pierce

[57] ABSTRACT

A combination splash/trickle pack for an evaporative cooler, which comprises packing elements 10,12 made from expanded metal or plastics sheets. The packing elements 10,12 are arranged such that in use they form a stack of packing elements within the cooler with the width and length of the packing elements determining the width and depth of the pack. Each of a plurality of the elements 10,12 has an inclined surface with an angle of inclination which varies so that in use a first region of the surface is sufficiently inclined to the horizontal to serve as a trickle surface and a second region of the surface is sufficiently close to the horizontal to serve as a splash surface.

20 Claims, 8 Drawing Sheets

| | | | | | |
|---|---|---|---|---|---|
| 3,346,246 | 10/1967 | Loetel et al. . | 4,052,491 | 10/1977 | Lefevre . |
| 3,363,531 | 1/1968 | Kohlmeyer et al. . | 4,181,692 | 1/1980 | Stone . |
| 3,389,895 | 6/1968 | De Flon ................................. 261/111 | 4,294,659 | 10/1981 | Campbell . |
| 3,516,647 | 6/1970 | Jaffe et al. . | 4,338,266 | 7/1982 | Flower . |
| 3,533,609 | 10/1970 | Brandt et al. . | 4,562,015 | 12/1985 | Lefevre . |
| 3,540,702 | 11/1970 | Uyama . | 4,762,650 | 8/1988 | Bosman . |
| 3,643,931 | 2/1972 | Henning et al. . | 4,915,877 | 4/1990 | Shepherd . |
| 3,647,191 | 3/1972 | Fordyce . | 5,112,537 | 5/1992 | Kinney, Jr. .............................. 261/111 |
| 3,751,017 | 8/1973 | Lemmens . | 5,279,774 | 1/1994 | Remy et al. ........................... 261/111 |
| 3,782,703 | 1/1974 | Kolar . | 5,372,752 | 12/1994 | Bosman .................................. 261/100 |
| 3,890,143 | 6/1975 | Skoglund et al. . | | | |

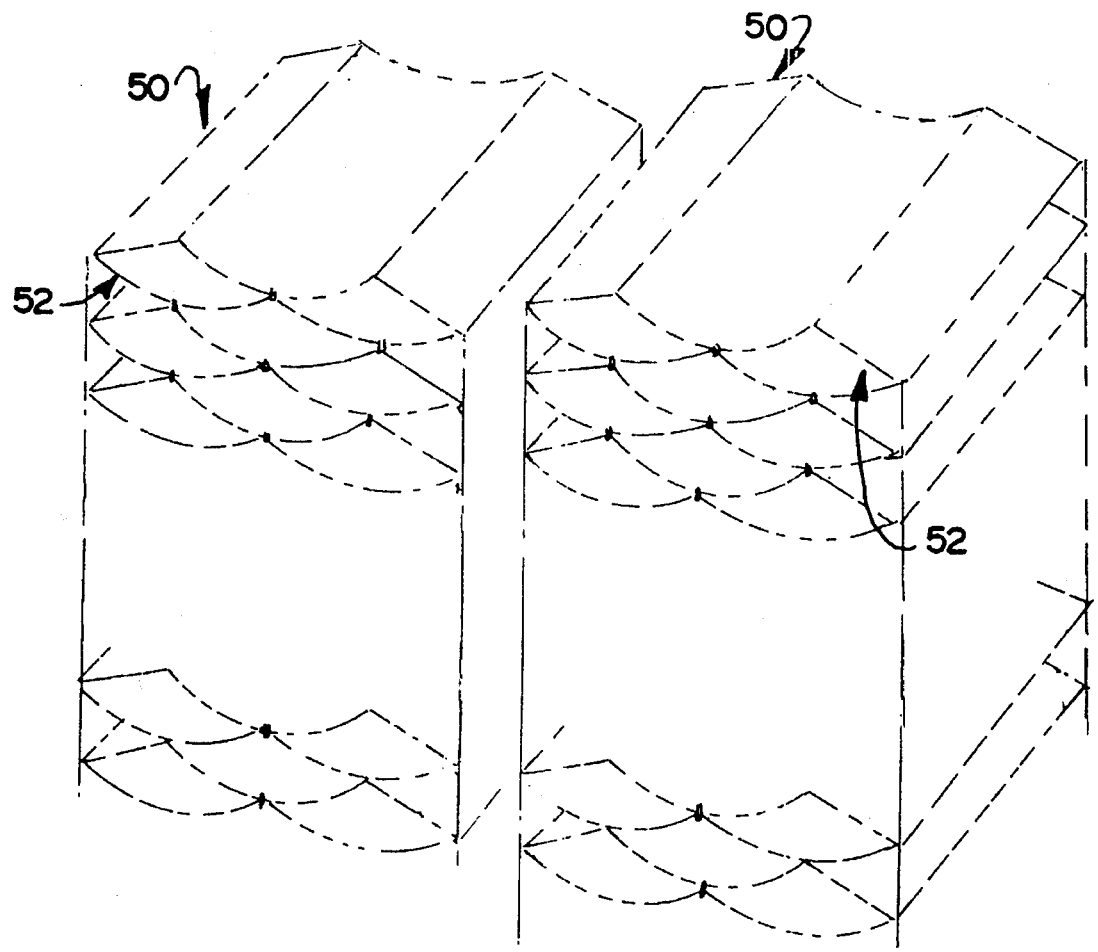
FIG 8
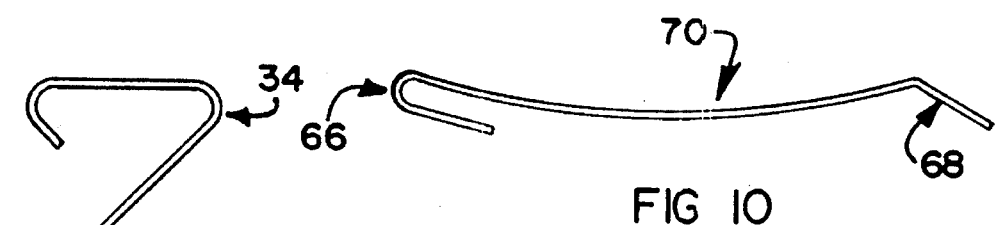
FIG 9
FIG 10
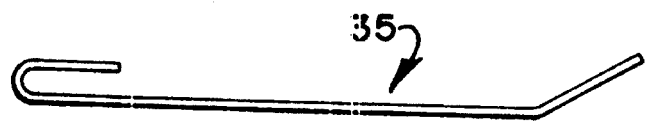
FIG 11

PACKING ELEMENTS, A PACK, A METHOD OF CONSTRUCTING A PACK, AND A METHOD FOR INSTALLING A PACKING IN AN EVAPORATIVE COOLER

This is a continuation-in-part of application Ser. No. 08/115,465, filed Sep. 1, 1993, now U.S. Pat. No. 5,372,752.

This invention relates to packing elements, to a pack, to a method for constructing a pack, and to a method for installing a packing in an evaporative cooler. Evaporative coolers may be used for cooling a gas such as air using a liquid such as water as a coolant, or for cooling a liquid using gas as a coolant, and/or for humidifying the gas.

Induced and natural draft wet cooling towers, in both cross and counter-flow configurations, are examples of an evaporative cooler to which this invention relates, for cooling water using air as the coolant. The present invention relates particularly to packings therefor. However, it should be understood that whenever the invention is described with respect to cooling towers only, it is not the Applicant's intention that the invention, insofar as it relates to evaporative coolers per se or to packs or packings therefor, be limited to cooling towers.

The Applicant is aware of different types of packings for wet cooling towers, and for evaporative coolers which work on the same principles as cooling towers. These include packings comprising packs which are known to the Applicant as "film packs", "trickle packs" and "splash packs" respectively. In wet cooling towers, the film packs and trickle packs provide an increased surface area over which the water can flow, thereby increasing the exposed surface area of the water to promote its cooling, whereas the splash packs provide impact surfaces for the water which, on impact with these surfaces breaks into relatively small droplets, thereby increasing the exposed surface area of the water to promote its cooling.

In pure splash pack configurations, horizontal splash surfaces are provided. Splash packs require a much larger volume to achieve the same cooling as a film pack. Film packs comprise a large number of thin plates which can be corrugated in various configurations to increase their surface area to provide as great a surface area as possible for a given unit volume. The water to be cooled spreads across the surface of the plates in the form of a thin film, to create a maximum air water contact area, per unit volume.

Trickle packs are similar to film packs but instead of providing an uninterrupted surface area across which the water can spread, essentially vertical apertured sheets or grids in close proximity to each other, are provided. Water drops trickle down the inter-aperture strips which are configured so as to extend the distance that the droplets travel. The grids in a trickle pack can be corrugated in a similar fashion to the plates in a film pack.

According to the invention there is provided a pack for an evaporative cooler, which pack has width, depth and length dimensions and comprises packing elements of an apertured material which are arranged such that in use they form a stack of packing elements within the cooler, the number of packing elements determining the length of the pack, and the packing elements having actual width and length dimensions which determine the width and depth of the pack, said pack being characterized by its being a combination splash/trickle pack with each of a plurality of the packing elements having an inclined surface with an angle of inclination which varies in a direction (D) corresponding to the width or length of the element so that the element has a profile width or profile length which is greater than its actual width or actual length, and in use a first region of the surface is sufficiently inclined to the horizontal to serve as a trickle surface and a second region of the surface is sufficiently close to the horizontal and sufficiently spaced from another packing element which is above it in the stack, to serve as a splash surface.

It will be appreciated that the length of the pack is its height dimension in use.

Further according to the invention there is provided a packing for an evaporative cooler, which has width, depth and height dimensions and includes stacked layers of packing elements of an apertured material, with the number of layers determining the height of the packing, the packing elements having actual width and length dimensions and being arranged such that the actual width, actual length and number of packing elements in each of the layers determines the width and depth of the packing, and packing elements in each of a plurality of the layers each has an inclined surface with an angle of inclination which varies in a direction (D) corresponding to the width or length of the element such that the element has a profile width or profile length which is greater than its actual width or actual length, the packing being characterized by its being a combination splash/trickle packing with said packing elements configured to provide in each of said plurality of layers, a first surface which is sufficiently inclined to the horizontal to serve as a trickle surface, and a second surface which is sufficiently close to the horizontal and sufficiently spaced from another packing element in a layer above it, to serve as a splash surface.

The inclined surface of a first of the plurality of packing elements may be a curved surface which curves in one direction and the inclined surface of a second of the plurality of packing elements may be a curved surface which curves in another direction, and the first and second packing elements may be arranged in a manner to encourage continual dispersion and discourage focusing of liquid as it passes through the pack in use.

By "focusing" is meant the convergence of the liquid to one or more particular regions of the pack from whence re-dispersion of the liquid over the surfaces of lower packing elements in the pack, cannot readily occur.

The packing elements may be aligned or staggered in the direction of the length of the pack or packing.

The packing elements may be substantially square, and may be arranged in the pack such that at least one of the packing elements is oriented at about 90° to the others, i.e. with its inclined surface having an angle of inclination varying in a direction corresponding to its width, while the inclined surface of other packing elements in the pack have their respective angles of inclination varying in a direction corresponding to the lengths of the elements.

The packing may comprise a plurality of packs as abovedescribed, with at least one of the packs oriented at about 90° to the others, i.e. with the inclined surfaces of the packing elements in at least one of the packs having an angle of inclination which varies in a first direction corresponding to the respective widths or lengths of the elements, and the inclined surfaces of the elements in another of the packs varying in a second direction which is substantially at 90° to the first direction.

The plurality of packing elements may comprise bent sheets of an apertured material which are connected to one another or to other sheets in the pack so as to retain the plurality of sheets in their bent configuration.

The second packing element may comprise an inverted first packing element.

The first packing element and the second packing element may each comprise a sheet of an apertured material having an angular bend and having an arcuate bend which defines the curved surface, and the angular bends of the first and second packing elements may be staggered.

The pack of the present invention combines features characteristic of both trickle and splash packs. Thus, the packing elements have aperture dimensions sufficiently great to inhibit filming of the liquid over the apertures in use. Further, the void ratio and size of the apertures are dependent upon whether the pack is intended for use in a cross-flow environment or for use in a counter-flow environment. In a cross-flow environment the size of the apertures needs to be sufficient to permit the liquid to pass through them. In a counter-flow environment, the size of the apertures needs to be sufficient to permit the passage therethrough of the liquid against the pressure of gas simultaneously being drawn upwardly through the apertures. For similar reasons, the void ratio of packing elements in a pack according to the invention intended for use in cross-flow conditions is generally lower than that of packing elements intended for use under counter-flow conditions. The dimensions of the apertures will also be dependent upon the nature of the particular liquid and the state of the liquid (e.g. its degree of cleanness). Whereas relatively small apertures will be suitable for relatively clean water, relatively large apertures and relatively wide inter-aperture strips will better suit relatively dirty water with a high proportion of impurities.

Furthermore, the width dimensions of inter-aperture strips of the packing elements are sufficiently great to provide effective impact or splash surfaces in the splash regions thereof and to effectively increase the exposed surface area of the liquid travelling over the surfaces in the trickle-pack regions of the packing elements. However, the top surface area of each of the packing elements (which is dependent upon the void ratio and width of the inter-aperture strips) is limited to an extent as will inhibit the formation of a liquid film (which is desired in film pack applications), and will promote flow or trickling of the liquid over the surface in the trickle regions of the packing elements.

Accordingly there are optimum values for dimensions of apertures, inter-aperture strips and void ratios, for combination splash/trickle pack packing elements.

The combination splash/trickle pack according to the invention comprises, as mentioned above, packing elements with inclined surfaces having varying angles of inclination. Thus the distance between adjacent (i.e. one above the other) packing elements in the pack varies. Respective regions of adjacent packing elements can touch each other or can be relatively close together, and other regions thereof are vertically spaced apart a distance which is great enough to cause the liquid coolant falling between the elements, to splash on impact with adjacent or more remote packing elements, such that sufficiently small droplets are formed. Thus the greatest distance between immediately adjacent packing elements can be less than what is required for falling liquid to accumulate sufficient energy to splash on impact, since the dimensions of the apertures and the void ratio of the packing elements are such that falling liquid not infrequently misses the adjacent packing element and impacts upon a lower packing element instead.

In a preferred splash/trickle pack according to the invention, the packing elements have a void ratio in the range of from about 0.6 to about 0.95; apertures which are substantially uniform in size with width and length dimensions of approximately 10 mm and 30 mm respectively to approximately 60 mm and 120 mm respectively; and inter-aperture strips with a width dimension of approximately 2 mm to 10 mm; and adjacent first and second packing element are spaced apart at their furthest points from each other, a distance of approximately 75 mm to 600 mm, more preferably in the region of 100 to 400 mm, even more preferably in the region of 200 to 300 mm.

According to the invention there is provided a method of constructing a combination splash/trickle pack for an evaporative cooler, which method includes providing a first packing element and a second packing element, each of the elements having been prepared by forming an angular bend in a sheet of a flexible, apertured material; and connecting the packing elements together in a manner such that in use the first and second packing elements are positioned one above the other and such that at least a portion of each of the packing elements has an arcuate bend which defines a curved surface, regions of which serve as splash and trickle surfaces respectively.

In one method according to the invention, the packing elements are connected together such that the angular bends of the first and second packing elements are staggered.

The first packing element may have two angular bends and an arcuate bend, the angular bends being separated from each other by the arcuate bend, and the second packing element may have two arcuate bends and an angular bend, the arcuate bends being separated from each other by the angular bend.

The packing elements may be connected together by attaching the first packing element to the angular bend of the second packing element. Preferably, the arcuate bend of the first packing element is attached to the angular bend of the second packing element. Instead, or in addition, the packing elements may be connected together by attaching one of the packing elements, along a periphery thereof, to the other packing elements.

The bends in the sheets constituting the first and second packing elements may be formed (e.g. as regards their relative configuration and positions) such that when the packing elements are placed with their respective bends staggered, at least a major portion of the periphery of the first packing element touches or is adjacent the second packing element. Preferably the distance between opposed peripheries of the first packing element in a direction across the bend(s), is substantially the same as the distance between the corresponding opposed peripheries of the second packing element and, furthermore, the bends in the packing elements are formed such that when the packing elements are placed with their respective bends staggered, said peripheries of the first packing element touch or are adjacent said peripheries of the second packing element.

The bends preferably are formed along the sheets of flexible, apertured material, but may be formed across the sheets if so desired.

It will be appreciated that the density of the pack can be varied by varying the angles of curvature of the bends in the sheets, thereby to vary the distance between adjacent packing elements.

A pack constructed according to the method of the invention is a combination trickle/splash pack. Each of the packing elements is undulating so that drops of liquid tend to flow (i.e. "trickle") along the inclined portions of the surfaces of the packing elements, increasing in size until they fall under gravity through the apertures to another packing element below. On impact (i.e. upon "splashing" on the surface of the packing element below) these larger drops break into relatively small droplets and the abovementioned trickle and splash processes are repeated. Meanwhile, those drops of liquid which strike a substantially horizontal portion of a packing element accumulate there until they can no longer be accommodated and fall under gravity to a packing element below where the trickle and splash processes are repeated.

Because of the gradual slope of the trickle surface regions of the packing elements according to the invention, droplets trickling down the pack have a longer distance to travel to achieve the same vertical displacement than in a conventional trickle pack in which the packing elements are generally vertically oriented. The pack of the invention thus provides a longer air contact time for the trickling liquid and thereby enhances the heat transfer capability of the pack.

The present invention is an improvement over both splash and trickle packs. In splash pack systems, it is necessary for the splash elements to be horizontal or as near horizontal as possible to avoid focussing. In trickle pack configurations, it is necessary for the pack elements to be as near vertical as possible to ensure that the liquid remains in close contact with the pack elements. The present invention is for a combination splash/trickle pack in which not only are the two types of packing configurations combined, but the combination results in an improvement in heat transfer efficiency over both the pure splash pack configuration and the pure trickle pack configuration, when that efficiency is related to the amount of material comprising the packing system.

Packing heat transfer characteristics are commonly defined by the term $$Ka\ v/L = \lambda (L/G)^{-n}$$

where

K is the coefficient of mass transfer defined in terms of difference in absolute humidity a is the area of effective transfer surface per unit packing volume V is the effective packed volume per unit plan area L is the mass of liquid flow per unit plan area G is the mass of gas flow per unit plan area $\lambda$ and n are constants dependent on the type of packing A is the actual transfer surface area of packing material per unit volume.

If V is assumed equal to unity then Ka/L per unit depth of pack can be defined for any packing system, and a comparison of Ka/L/A per unit area of pack material can be used to define the efficiency of the pack system. On this basis one finds that splash systems are in fact very efficient in terms of material used, whereas trickle pack systems are in fact less efficient, if the same type of material is used for both systems.

This can easily be explained by the fact that a splash pack utilises the energy of the falling liquid to break up the liquid into small droplets thereby providing the extended surface area required for heat transfer whereas a trickle pack has to rely entirely on the surface area provided by the packing material.

However, despite this seeming inefficiency of trickle packs in relation to splash packs, trickle packs have a major advantage over splash packs, as for the same unit volume, they achieve a much higher heat transfer rate, i.e. for the same cooling performance trickle packs are far more compact and where space is a premium, they would normally have a decided advantage over splash packing systems.

The purpose of the present invention utilises the advantages of both packing systems by combining the splash and trickle features of both systems. This results in a unique packing system which has the advantage of the compactness of a trickle pack system and the material efficiency of a splash system. Furthermore the combination of the two systems results in a packing system which has a higher heat transfer material efficiency than both the original systems. This can be illustrated as follows:

Consider two different configurations of the invention in its preferred form, as illustrated in FIGS. 21 and 22.

FIG. 21 is a very flat configuration which can be characterised by the ratio F, being profile length, actual length, r/l which in this case could be say 1.1. FIG. 22 on the other hand has a deep configuration which if the curved element were semi-circle, the ratio F would be 1.57.

In practice, the flatter the configuration, as in FIG. 21, resulting in the packing elements being almost horizontal, the closer the performance of the arrangement approaches that of a pure splash pack system. By contrast, the deeper the configuration i.e. with the elements being more vertically disposed as depicted by FIG. 22, the closer the performance approaches that of a trickle pack system.

For a given value of L, and with G being equal to L, values of Ka/L can be obtained, for a variety of the preferred packing configurations in which the shape is varied from FIG. 21 to FIG. 22, i.e. in which the ratio F is varied from 1.1 to 1.57. For each value of F, a specific value of Ka/L and A can be derived. Values of Ka/L/A representing packing transfer characteristics per unit of packing material transfer surface area have been derived from a cooling tower test facility. Plotting Ka/L/A against F the following becomes evident:

The graph of FIG. 23 clearly shows that as F increases from a low value of say 1.1, Ka/L/A also increases to an optimum value and then decreases again to low value at F=1.57. This clearly indicates that an optimum value of F lies in the range 1.2 to 1.35 and that within this range optimum heat transfer efficiency in relation to material used, is obtained. Furthermore, as this efficiency is greater than either extreme, i.e. the pure splash configuration where F=1 or the pure trickle where F exceeds 1.57, it is clear that the invention represents a significant improvement over both the pure splash pack and pure trickle pack systems.

Thus according to the invention the ratio F is preferably in the range of about 1.1 to about 1.57, more preferably 1.14 to about 1.42 even more preferably 1.18 to about 1.36, and most preferably 1.2 to about 1.35.

The sheets from which the packing elements are prepared may be of an expanded metal which is corrosion resistant, or of plastics material. The inter-aperture strips of metal or plastic forming the major surfaces of the sheets, provide trickle or splash surfaces as the case may be. The expanded metal or plastics sheets may be raised or flattened. Preferably the sheets have-flat major surfaces to maximise the splash resulting from impact of a droplet upon it.

Whenever the terms "expanded metal" and "expanded plastics" are used herein, they should be understood to mean a metal or plastics network formed by suitable stamping or cutting sheet metal or plastic and stretching it to form an open mesh.

The method according to the invention may include constructing the pack on a substantially horizontal support surface, by orienting the packing elements so as to place their major surfaces in vertical planes and with each of the packing elements being self-supportable on a periphery thereof from which the bends extend in a substantially vertical direction. Thus, the pack can be constructed at ground level.

The packing elements may be connected to each other by tying them together, for example at intervals with wire ties. Instead, or in addition, the packing elements may be connected together by means of a rigid connecting element threaded through apertures of both packing elements. Furthermore, the packing elements may be connected to each other by twisting together inter-apertured strips at respective peripheries of the packing elements.

The shape of the arcuate bends may be retained by means of longitudinally spaced rigid retaining elements which extend across the arc. Both ends of the retaining elements may be hooked to facilitate attachment thereof to the packing element.

Furthermore, the distance (i.e. the space) between the first and second packing elements may be maintained by a rigid spacer element spanning the space and fastened to the first and second packing elements. Instead, the distance may be maintained by means of further retaining elements extending across the arcuate bends in the second packing element.

Further according to the invention there is provided a method of installing a packing in an evaporative cooler, which includes suspending within the cooler, a pack prepared according to the method of the invention as above described.

The installation method may include rotating and suspending the pack to provide a stack of interconnected packing elements within the cooler. Where the pack is installed within a cooling tower, for example, the top-most packing element can be fastened to a structural member within the cooling tower and, thereafter, the pack is self-supporting since the individual packing elements support one another as above described.

The installation method may further include suspending, side by side, a plurality of packs prepared according to the method of the invention. Then the size of the packing elements and hence the in-use length and width dimensions of the packs may be dictated by the particular configuration of structural members within the cooling tower from which the packs are to be suspended.

For counter-flow evaporative coolers, the pack/stack of interconnected packing elements preferably is suspended substantially vertically within the evaporative cooler. However for cross-flow evaporative coolers, the pack/stack of packing elements can conveniently be tilted, for example by up to about 45° or more from the vertical, to compensate for the angle of displacement of the water which is blown in a sideward direction by the cross flow of air through the evaporative cooler.

The invention extends to a packing element which is of an apertured sheet material and has actual width and length dimensions, and has an inclined surface with an angle of inclination which varies in a direction (D) corresponding to the width or length of the sheet such that the sheet has a profile width or profile length which is greater than its actual width or actual length, the packing element being adapted for use in a combination splash/trickle pack according to the invention, a first region of the surface being sufficiently inclined to the horizontal to serve as a trickle surface and a second region of the surface being sufficiently close to the horizontal to serve as a splash surface.

The ratio (F) of profile length to actual length may fall within the range of about 1.1 to about 1.57, preferably about 1.2 to about 1.35, and adjacent packing elements are spaced apart at their furthest points from each other, a distance (d) of about 75 mm to about 600 mm, preferably about 100 mm to about 400 mm, more preferably about 200 mm to about 300 mm.

The invention extends further to a packing element which has been prepared for use in the method according to the invention.

In the Applicant's opinion, the packing element described in the specification and/or claims of its U.S. Pat. No. 4,762,650 are particularly suitable for use as the sheets of flexible, apertured material from which the packing elements of the present invention can be prepared by forming bends in the sheets as above-described. Accordingly, the entire specification of its said U.S. patent is incorporated herein, by way of reference.

A tie for tying together first and second apertured packing elements of a pack constructed according to the method of the invention as above described, may be generally V- or S-shaped with a hook at one end and having a particular size and shape that enables it to be positioned with its hooked end hooked onto one of the packing elements and its other end projecting through one of the apertures of the second packing element, in a region of the pack where the first and second packing elements touch or are adjacent each other.

In use, the tie can be located in an operative position through apertures of the first and second packing elements by flexing one or other of these packing elements while pushing and/or pivoting the tie through the apertures and/or hooking the hooked end thereof onto the element (s) .

The other end of the tie may be hooked or curved.

The invention extends, yet further, to a connecting element for connecting together first and second apertured packing elements of a pack constructed according to the method of the invention as above described, the connecting element being elongate with a hook at one end and having a slightly curved other end to enable it to be threaded through apertures of both the first and second packing elements in a region where the first and second packing elements touch or are adjacent each other.

In use, the curved other end can readily be passed through apertures of both the first and second packing elements by rotating it while pushing it in the desired direction of threading. Its hooked end is hooked onto an inter-aperture strip of one or both of the packing elements.

The invention is now described by way of the following non-limiting examples and with reference to the drawings in which FIG. 1 is an end view of an expanded metal sheet which has been bent in the process of forming a packing element according to the invention;

FIG. 8 is a schematic drawing of a pack constructed according to the method of the invention with packing elements as shown in FIGS. 5 and 6;

FIGS. 9 to 11 are three-dimensional drawings of a tie, a connecting element, and a further connecting element respectively, for use in the method of the invention; and FIGS. 12 to 16 are schematic representations of portions of various embodiments of packings according to the invention; and FIGS. 17 to 20 illustrate a method of connecting adjacent packing elements together along their respective peripheries.

Figure 21:
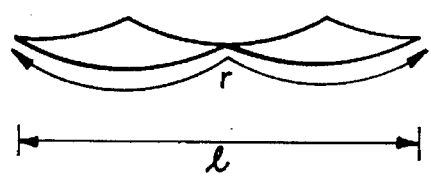
Figure 22:
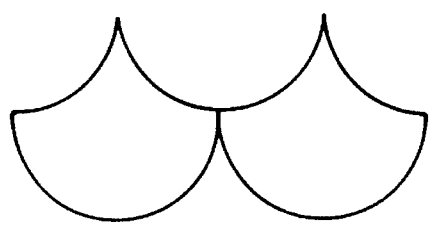

FIGS. 21 and 22 show two different configurations of the invention in its preferred form.

Figure 23:
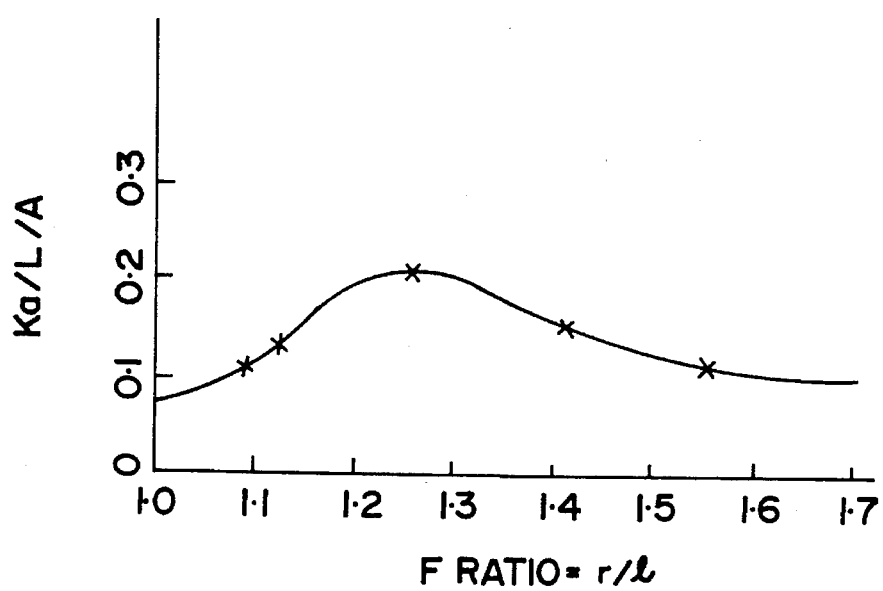

FIG. 23 is a graph of F Ratio.

In the drawings, reference numerals 10 and 12 generally indicate packing elements according to the invention, for use in a method of constructing a packing for a cooling tower or other evaporative cooler.

Figure 1:
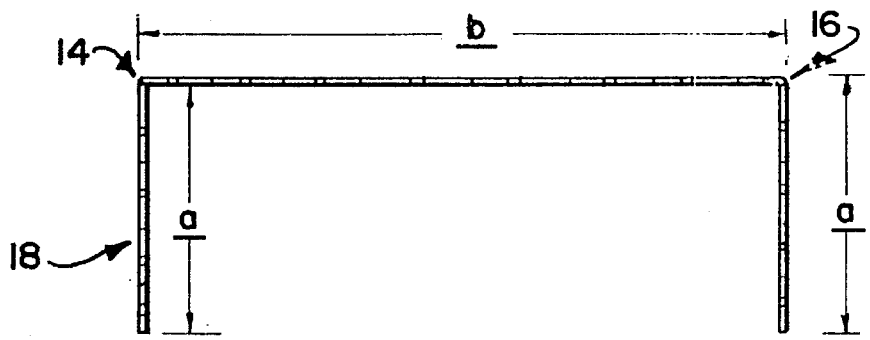
Figure 2:
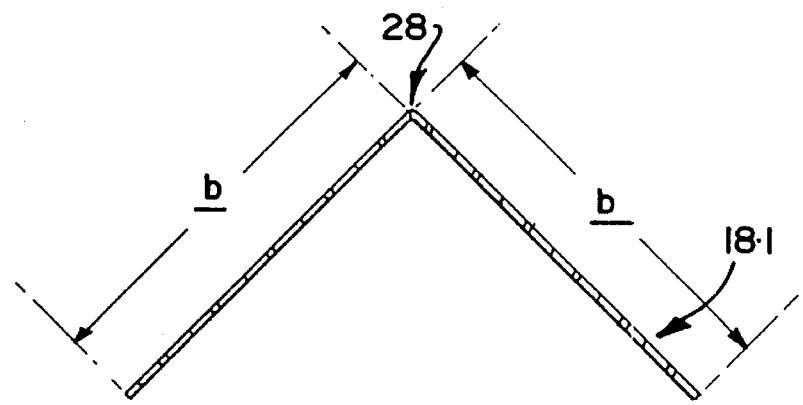
FIG. 2 is another expanded metal sheet similar to the sheet of FIG. 1, which has been bent in the process of preparing another embodiment of a packing element according to the invention.

Packing element 10 is prepared by forming two angular bends 14 and 16 (as shown in FIG. 1) in a sheet of expanded metal 18. The bends 14, 16 are formed along the sheet 18 such that each of the bends 14, 16 is at the same distance a from the adjacent periphery of the sheet 18 and the distance b between the bends 14, 16 is twice the distance a. An arcuate bend 20 is then formed (FIG. 3) along the sheet 18 between the angular bends 14, 16, and the arcuate shape of this bend 20 is retained by means of retaining elements 22 in the form of 2 mm lengths of wire with a hook at each end. The wire ties are located across the arcuate bend 20 and at intervals along the length of the sheet 18, by hooking the ends of the elements 22 around inter-aperture strips in the respective vicinities of the angular bends 14, 16.

The packing element 10 is placed on a support surface (preferably at ground level below and near the site at which it is to be used). It is self-supported on an end periphery 26 thereof with the angular and arcuate bends 14, 16, 20 extending substantially vertically from the support surface.

Figure 3:
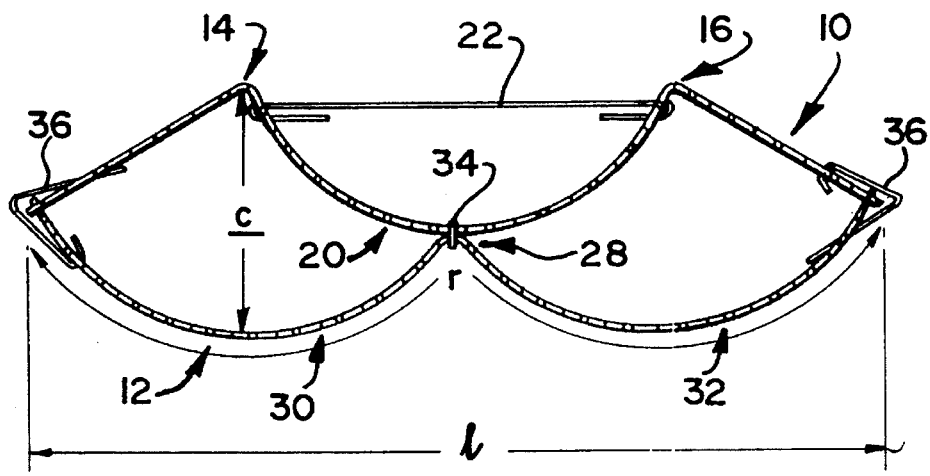
FIG. 3 is an end view of two packing elements prepared from the sheets of FIGS. 1 and 2 respectively and connected together in accordance with the method of the invention.
Figure 4:
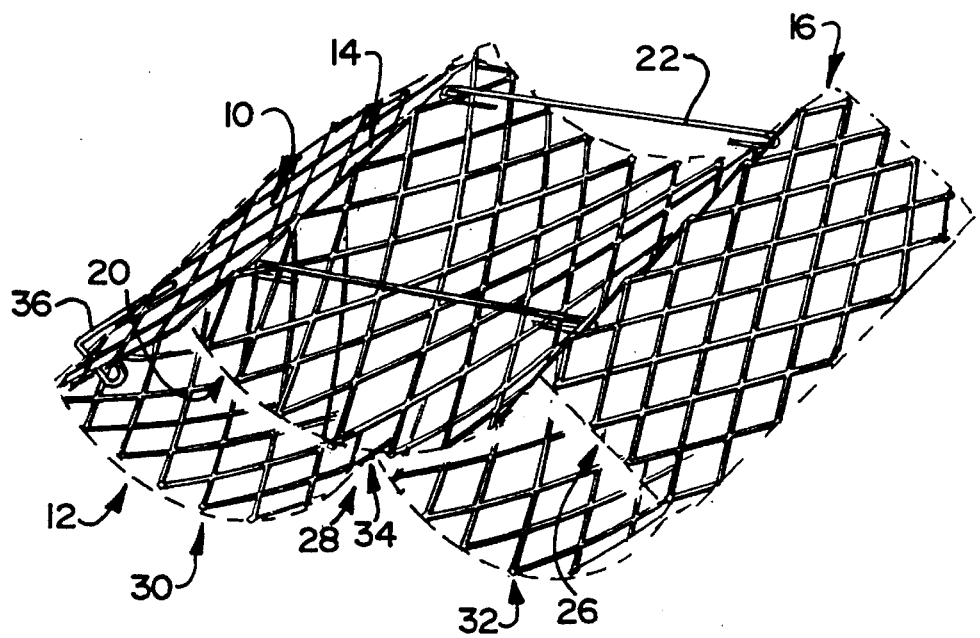
FIG. 4 is a three-dimensional view of a portion of the interconnected packing elements shown in FIG. 3.

The packing element 12 is prepared by forming an angular bend 28 along the length of an expanded metal sheet 18.1 which is identical in all respects to the abovementioned sheet 18. The angular bend 28 is formed equidistant (ie at a distance b) from the opposed side peripheries of the sheet 18.1. An arcuate bend 30, 32 is then formed along the sheet 18.1 on each side of the angular bend 28, and extending to the adjacent side periphery of the sheet 18.1. Packing element 12 is placed on the support surface next to the packing element 10 so that the respective bends 14, 16, 20 and 30, 28, 32 of the packing elements 10 and 12 are staggered as shown in FIG. 3 and the angular bend 28 of packing element 12 touches the arcuate bend 20 of packing element 10 along the respective lengths of the two elements 10, 12. Elements 10, 12 are connected together along this touching region by means of 3 mm wire ties 34 (FIG. 9) which are threaded through apertures in both packing elements 10, 12 and hooked to an inter-aperture strip of one of the elements 10, 12. Instead, or in addition, 3 mm wire connecting elements 35 (FIG. 11) are threaded through aligned apertures of the packing elements 10, 12 in this touching region. One end of the element 35 is hooked for attachment to aligned inter-aperture strips of the packing elements 10, 12 while the other end is slightly curved to facilitate threading through aligned apertures as above described.

The side peripheries of packing element 12 are brought into engagement with the side peripheries of packing element 10, and these inter-engaging side peripheries of elements 10 and 12 are connected by means of wire ties 36 located through apertures of both elements 10 and 12 as shown in FIG. 3. The ties 36 are located at intervals along the opposed peripheries of elements 10 and 12. Instead, packing elements 10 and 12 can be connected by twisting together inter-aperture strips (optionally at intervals) along the respective peripheries of the elements 10, 12, as shown in FIGS. 17 to 20.

FIGS. 17 to 20 illustrate inter-aperture strips 12.1 of the element 12 being placed through apertures 10.2 defined by inter-aperture strips 10.1 of the element 10, and the inter-aperture strips 12.1 and 10.1 being twisted together with the aid of a screwdriver or like tool 84.

A packing element 10.1 similar to packing element 10 is prepared as described above and placed next to the packing element 12 with its two angular bends touching the two arcuate bends 30, 32 of packing element 12 where the packing element 10.1 is connected to packing element 12 at intervals along the lengths thereof by means of further ties 34.

Further packing elements 12.1, 12.2, etc. are prepared as described above for packing element 12, and further packing elements 10.2, etc. are prepared as described above for packing element 10, and connected together as described above for packing elements 10, 12 and 10.1.

The number of interconnected elements 10, 12 for a single pack will be dictated by the depth of the packing required for the particular cooling tower for which it is being constructed. When this number is reached, the pack is turned through 90° to provide a stack 38 of packing elements with packing element 10 as the top-most, and the stack 38 is then hoisted into the desired position in the cooling tower. The packing element 10 is fastened in any convenient manner to one of the structural beams of the cooling tower. In all other respects, the pack 38 is self-supporting.

If necessary, the spacing c which can vary from about 75 to 600 mm between adjacent packing elements 10, 12 can be maintained, for example at about 250 mm, by means of spacer elements (not shown) which may be in the form of 3 mm lengths of wire attached to packing elements 10 and 12 respectively and designed to span the desired distances between the angular bends 14, 16 of packing element 10 and the furthest points of the arcuate bends 30, 32 of the packing element 12. Instead, the spacing between adjacent elements can be maintained by using further retaining elements 22 to retain the desired shape of the angular bends 30, 32 of packing element 12 in a similar manner in which they are used to retain the shape of the angular bend 20 of packing element 10.

It will be appreciated that the profile width (which is represented in FIG. 3 as r) of each of the packing elements 10 and 12 is 2b (being the width of the sheet of expanded metal 18), and that the profile width of each of the elements 10 and 12 is greater than the actual width which is represented in FIG. 3 as l. The ratio F of profile width to actual width (r/l) can vary from about 1.1 to about 1.57, but is preferably maintained in the range of about 1.2 to about 1.35.

A number of similar packs are constructed as described above and are hoisted as stacks 38.1, 38.2, etc. into position in side-by-side relationship with the first stack 38 (see FIG. 12) until a desired packing for the cooling tower is installed.

If the structural beams in the cooling tower from which the packs/stacks 38, 38.1, 38.2, etc. are suspended, are spaced apart a distance of approximately 1 meter, a convenient width for the packing elements 10, 12 is approximately 2 meters with the distance between angular bends 14, 16 being approximately 1 meter. The packing element 10 can then readily be fastened to two adjacent beams along its angular bends 14, 16. The Applicant further considers 1,2 m to be a convenient length for the packing elements 10, 12.

Figure 7:
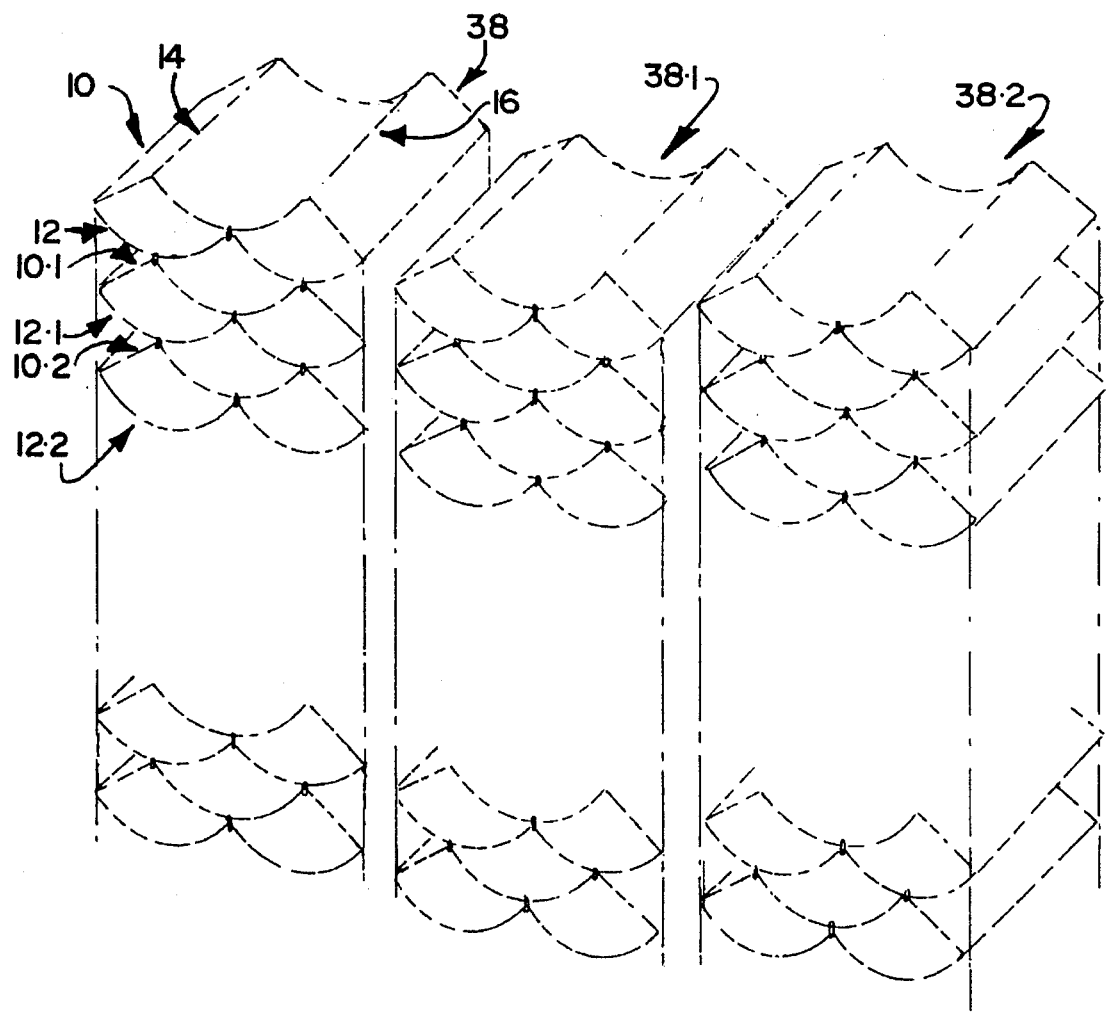
FIG. 7 is a schematic drawing of a pack constructed according to the method of the invention with packing elements as shown in FIGS. 3 and 4.

Optionally the packs can be installed in the same orientation to one another, i.e. as shown in FIGS. 7 and 8; or they can be installed with one or more of the packs rotated through about 90° about a longitudinal axis, i.e. so that the inclined surfaces of the packing elements constituting one or more of the packs have respective angles of inclination which vary in a direction which is substantially at 90° to those of the packing elements constituting the other pack(s).

Figure 5:
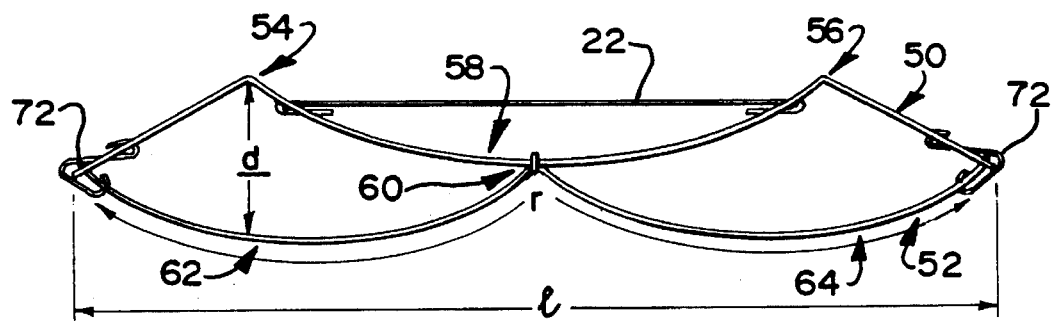
FIG. 5 is a section through two further embodiments of packing elements according to the invention, connected together according to the method of the invention.
Figure 6:
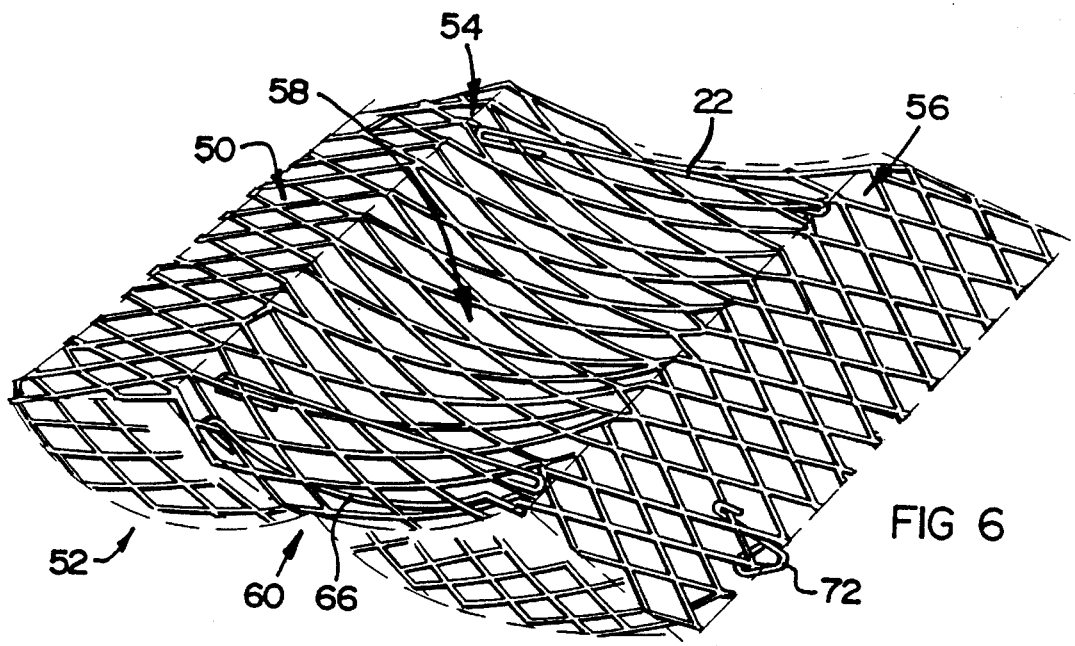
FIG. 6 is a three-dimensional view of a portion of the interconnected packing elements shown in FIG. 5.

FIGS. 5 and 6 show packing elements 50 and 52 which are similar to packing elements 10 and 12. They differ from elements 10 and 12 in that the angular and arcuate bends 14, 16, 20 and 28, 30, 32 are formed along the expanded metal sheets, whereas packing elements 50 and 52 are prepared by forming angular and arcuate bends 54, 56, 58 and 60, 62, 64 across expanded metal sheets similar to those (18, 18.1) used for packing elements 10 and 12. Thus the elements 50 and 52 have profile lengths r which are greater than their actual lengths l.

Packing elements 50 and 52 are connected together in similar manner to packing elements 10 and 12. The angular bend 60 of packing element 52 touches the lowest point of the arcuate bend 58 of packing element 50, along the width thereof, and elements 50 and 52 are connected together at intervals in this touching region by means of elongate 3 mm wire connecting elements 66 located along the packing elements at right angles to the direction of the angular and arcuate bends 54, 56, 58, 60. The connecting elements 66 are threaded through apertures of both packing elements 50 and 52 and hooked onto an inter-aperture strip of one of the packing elements 50, 52. A curved end portion 68, and an arcuate bend 70 along the element 66 and which corresponds with the arcuate bend 58 of the packing element 50, facilitate threading of the connecting element 66 into its operative position.

Furthermore, the end peripheries of packing elements 50 and 52 engage with one another in a similar manner in which the side peripheries of elements 10 and 12 interengage. The interengaged end peripheries of elements 50 and 52 are connected together by means of 3 mm wire ties 72 as shown in FIG. 5, which pass through apertures of both packing elements 50 and 52 and hook onto inter-aperture strips of both elements. Instead, packing elements 50 and 52 can be connected by twisting together inter-aperture strips at or along the respective peripheries of the elements 50, 52, in similar manner as described above for packing elements 10, 12 with reference to FIGS. 17 to 20.

At their furthest points from each other the packing elements 50 and 52 are at a distance d of about 150 mm apart, but can vary from 75 mm to 600 mm. The ratio F(r/l) is in the range of about 1.2 to about 1.35, but can vary from about 1.1 to about 1.57.

FIGS. 12 to 16 illustrate portions of various embodiments of packings according to the invention, which comprise packing elements 12 or 80. Adjacent elements (i.e. one above the other) 12 or 80 in the embodiments shown in FIGS. 12, 13, 14, 15 and 16 are spaced apart, at their furthest points from each other, a distance e of about 200 mm, but can vary from about 75 mm to 600 mm. The ratio F(r/l) is in the range of about 1.2 to about 1.35, but can vary from about 1.1 to about 1.57. Arrows indicate the directions of flow of water trickling along the trickle surfaces of the packings illustrated.

Figure 12:
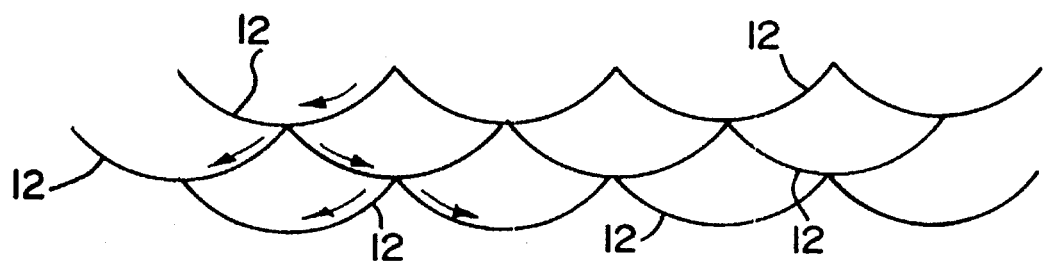

In FIG. 12, three layers of packing elements according to the invention, are shown, with two packing elements 12 in each layer. The elements 12 in each layer are connected by twisting together inter-aperture strips at intervals along their respective peripheries. This method of connection is not illustrated in FIG. 12 but can be seen in FIGS. 17 to 20. The packing elements 12 are staggered in the direction of the length of the pack.

It will be appreciated that the configuration illustrated in FIG. 12 can also be achieved with packing elements 80, each comprising a sheet of apertured material having a single arcuate bend which extends across the entire width or length of the sheet. Four packing elements 80 in each of the three layers could then be used to obtain the configuration (shown in FIG. 12) achieved with two elements 12 in each layer.

Figure 13:
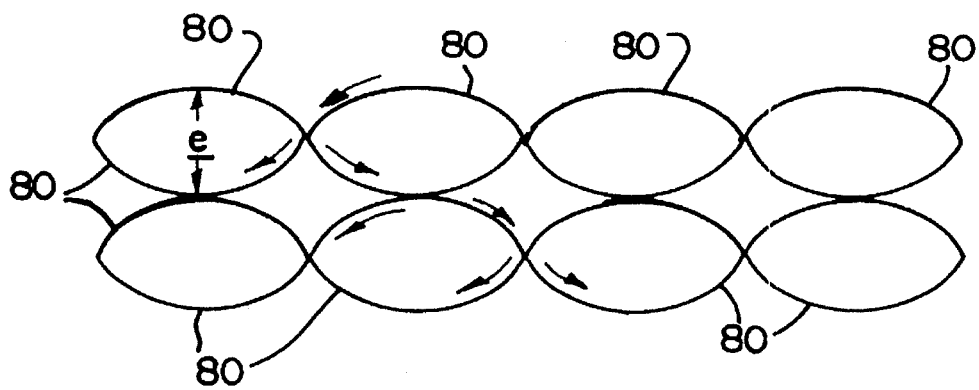

In FIG. 13, four layers of packing elements 80 according to the invention, are shown, with four elements 80 in each layer. As can readily be seen, the packing elements 80 in the second and fourth layers are inverted relative to those in the first and third layers. The four elements 80 in each of the layers are connected (not shown) by twisting together inter-aperture strips at intervals along their respective peripheries. The packing elements 80 are aligned in the direction of the length of the pack.

Figure 14:
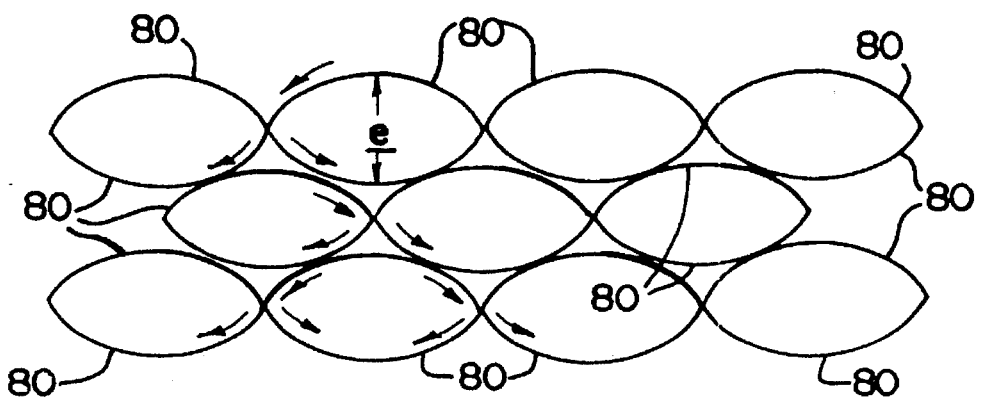

In FIG. 14, six layers of packing elements 80 are shown. The packing (only a portion of which is illustrated in FIG. 14), is similar to that of FIG. 13 in most respects, and differs only in that the layers of the FIG. 14 packing are arranged in pairs with adjacent (the one above the other) elements 80 in each pair of layers being aligned with each other, and adjacent (i.e. one above the other) pairs of layers being staggered in the direction of the length of the pack.

Figure 15:
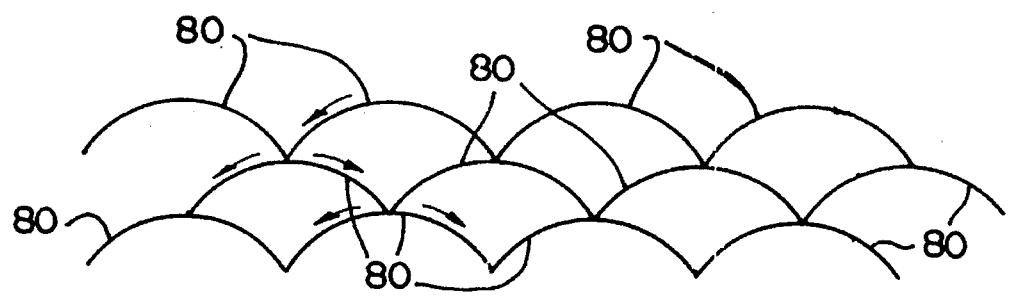

In FIG. 15, three layers of packing elements 80 are shown with four elements 80 in each layer. The elements 80 are staggered in the direction of the length of the pack.

Figure 16:
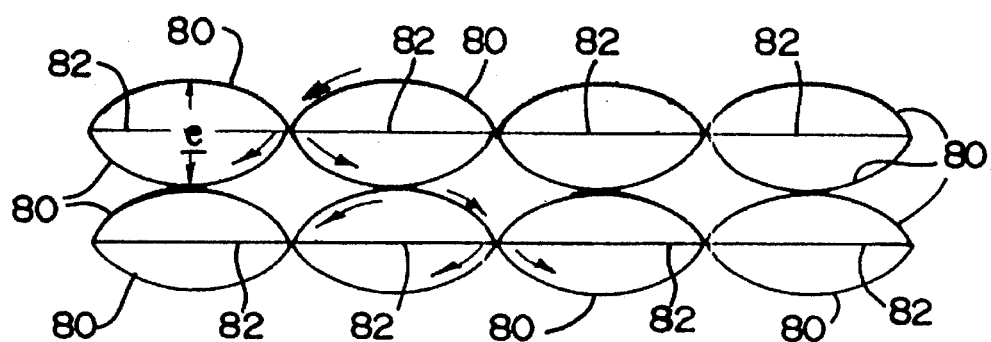
Figure 17:
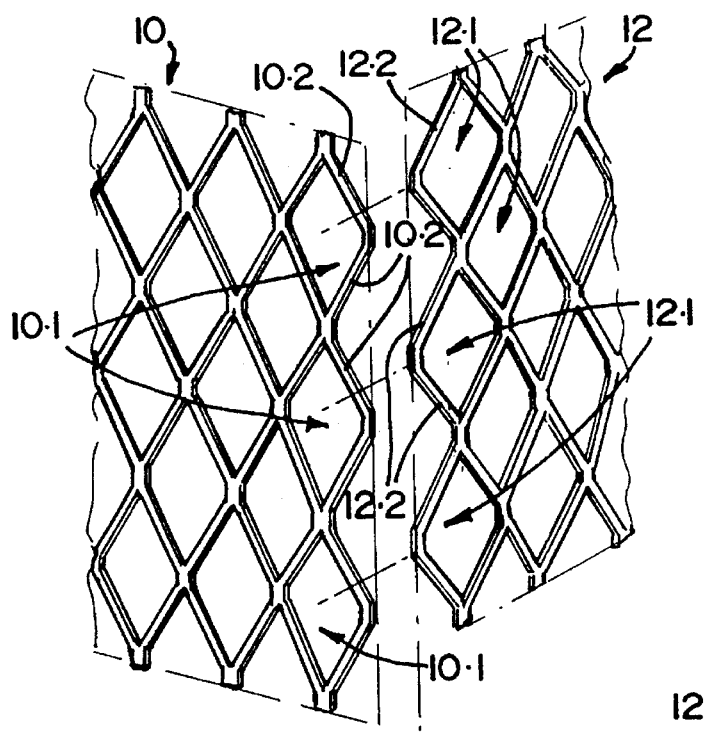
Figure 19:
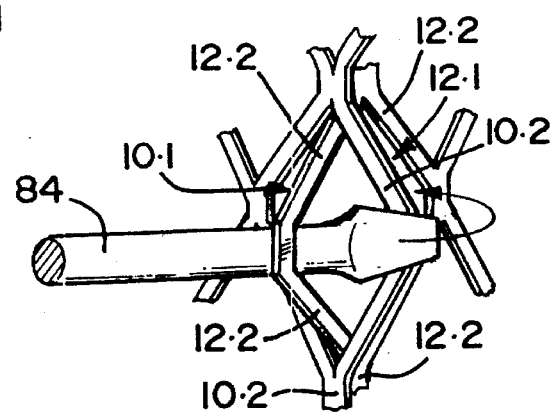
Figure 18:
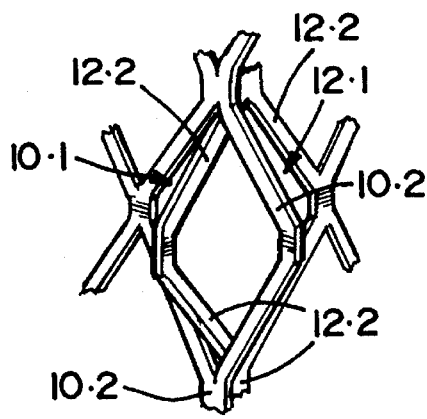
Figure 20:
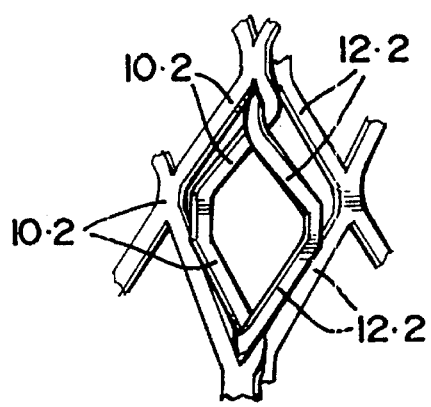

In FIG. 16, reference numeral 82 generally indicates packing elements which comprise sheets of a flexible apertured material similar to the sheets from which the packing elements 10, 12 and 80 are prepared. As is evident from the drawing, the packing elements 82 form intermediate layers vertically spaced apart from one another, throughout the packing. These layers being essentially horizontal also serve to increase the splash surface area of the pack. The packing elements 82 serve to retain the arcuate shape of the packing elements 80. Accordingly retaining elements (e.g. the wire elements 22 shown in FIGS. 2 to 6) are not required.

The layers of packing elements in the packings which are partially illustrated in FIGS. 12 to 16 can be connected together by means of the wire ties 34, 36, 72 or connecting elements 35, 66 as described above and illustrated in the drawings. Instead, or in addition, where respective peripheries of packing elements 12, 80, 82 in different layers are adjacent each other, such packing elements (and hence different layers) can be connected by twisting together the inter-aperture strips at said peripheries.

In the packs and packings of the invention, all of the separate advantages of conventional splash packs and trickle packs are combined, and such packs and packings can beneficially be used for counterflow and crossflow cooling without losing any advantages. Further advantages of the invention, at least as exemplified, include the simplicity of construction of the packing elements, and the ease with which a packing can be constructed according to the method. Conventional complicated support systems for supporting packings within cooling towers and the like can now be dispensed with. All that is required is for the top packing element of each pack to be fastened to one of the structural beams within the tower. Alternatively, with suitable support beams provided below the packing, the packing elements can simply be stacked one above the other, supported from below. In all other respects a pack constructed according to the method of the invention can be self-supporting. Furthermore, the packs can be constructed at ground level, thereby obviating scaffolding requirements and reducing the risk of accidents and labour costs. Yet further, because of the self-supporting nature of the pack, relatively light connecters and ties are required, with a resulting saving in material costs.

The present invention, at least as exemplified, improves upon conventional packs in several important respects. The apertured corrosion-resistant material of the packing elements (preferably expanded metal such as stainless steel) does not require the provision of horizontally disposed support members, it is essentially self-supporting. The particular configurations of the apertured sheets from which the packing elements are prepared, e.g. the sheet dimensions, the angle of inclination of the trickle regions, the width of the inter-aperture strips, the void ratio and aperture dimensions, are optimised to promote trickle formation rather than film formation of liquid in the trickle regions of the inclined surfaces, to inhibit concentration of the liquid at the lowermost points of the layers of packing elements, throughout the pack. By limiting the formation of a liquid film on the packing element by providing, inter alia, a smaller surface area than is available in film packs, not only is there a significant saving in material, which makes it feasible to use stainless steel, but the resulting increased uniformity of dispersion throughout the pack allows greater advantage to be taken of both splash and trickle cooling effects.

The generally diamond configuration of the pack according to the present invention increases the actual distance travelled by liquid trickling under gravity along trickle regions of the packing elements. The overall liquid/air contact time is thereby increased and the cooling effectiveness of the pack is thereby improved significantly.

As mentioned above, the packing elements can be interconnected and self-supporting, the pack being suspended by an upper packing element from a support member in a cooling tower. This enables tilting or pivoting of the pack so that the packing elements are inclined away from the horizontal. This is a considerable advantage in cross-flow packing configurations since the packing elements can be inclined towards the direction of air flow, to allow the liquid to gravitate towards the direction of air flow and thereby causing counter-flow to be superimposed on the overall cross-flow. The cooling efficiency of the pack is thereby considerably enhanced.

Another advantage of the present invention is the inherent flexibility of the packing elements, particularly those of expanded metal. Because of the flexibility they tend to vibrate to a very limited extent in use, under impact of the liquid. The vibration tends to promote disintegration of the water into droplets upon impact and dispersion of the droplets.

An advantage of expanded metal packing elements of the invention, is their high thermal conductivity.

I claim:

1. A pack for an evaporative cooler, which pack has width, depth and length dimensions and comprises packing elements of an apertured material which are arranged such that in use they form a stack of packing elements within the cooler, the number of packing elements determining the length of the pack, and the packing elements having actual width and length dimensions which determine the width and depth of the pack, said pack being characterized by its being a combination splash/trickle pack with each of a plurality of the packing elements having an inclined surface with an angle of inclination which varies in a direction (D) corresponding to the width or length of the element so that the element has a profile width or profile length which is greater than its actual width or actual length, and in use a first region of the surface is sufficiently inclined to the horizontal to serve as a trickle surface and a second region of the surface is sufficiently close to the horizontal and sufficiently spaced from another packing element which is above it in the stack, to serve as a splash surface.

2. A pack as claimed in claim 1, wherein the plurality of packing elements comprise bent sheets of an apertured material which are connected to one another or to other sheets in the pack so as to retain the plurality of sheets in their bent configuration.

3. A method for installing, in an installation site in an evaporative cooler, a packing comprising a plurality of packs, which method includes constructing on a substantially horizontal support surface which is outside the installation site, a plurality of combination splash/trickle packs as claimed in claim 1, and comprising packing elements which are connected to one another so as to form a cohesive assembly thereof, and supporting the constructed packs, side by side, within the cooler.

4. A pack as claimed in claim 1, wherein each of the plurality of packing elements has a single arcuate bend which extends across its entire width or length.

5. A packing for an evaporative cooler, which comprises a plurality of combination splash/trickle packs as claimed in claim 1, arranged side by side.

6. A method of constructing a pack, which method includes providing a first packing element and a second packing element, each of the elements comprising a sheet of a flexible, apertured material; and connecting the packing elements together in a manner to provide a combination splash/trickle pack as claimed in claim 1, with the first and second packing elements being positioned such that when the pack is oriented for use, the first and second packing elements are located one above the other; in a manner such that at least a portion of each of the packing elements has an arcuate bend which defines a curved surface, regions of which serve as splash and trickle surfaces respectively; and in a manner to provide a unitary structure with the packing elements forming a cohesive assembly thereof.

7. A pack as claimed in claim 1, wherein the ratio (F) of profile length to actual length falls within the range of about 1.1 to about 1.57, and adjacent packing elements are spaced apart at their furthest points from each other, a distance (d) of about 75 mm to about 600 mm.

8. A pack as claimed in claim 7, wherein the ratio F falls within the range of about 1.2 to about 1.35, and the distance d is about 200 mm to about 400 mm.

9. A pack as claimed in claim 1, wherein the inclined surface of a first of the plurality of packing elements is a curved surface which curves in one direction and the inclined surface of a second of the plurality of packing elements is a curved surface which curves in another direction, and the first and second packing elements are arranged in a manner to encourage continual dispersion and discourage focusing of liquid as it passes through the pack in use.

10. A pack as claimed in claim 9, wherein the second packing element comprises an inverted first packing element.

11. A pack as claimed in claim 9, wherein the respective configurations and relative positions of the first and second packing elements are such that opposed peripheries of the first packing elements touch or are adjacent opposed peripheries of the second packing elements.

12. A method of constructing a pack, which method includes provididing a first packing element and a second packing element, each of the elements comprising a sheet of a flexible, apertured material; and connecting the packing elements together in a manner to provide a combination splash/trickle pack as claimed in claim 1, with the first and second packing elements being positioned such that when the pack is oriented for use, the first and second packing elements are located one above the other, and in a manner such that at least a portion of each of the packing elements has an arcuate bend which defines a curved surface, regions of which serve as splash and trickle surfaces respectively.

13. A method as claimed in claim 12, wherein the packing elements are connected to each other by twisting together inter-aperture strips at respective peripheries of the packing elements.

14. A method as claimed in claim 12 for constructing a pack for installing in an installation site in an evaporative cooler, and which includes assembling the packing elements on a substantially horizontal support surface outside the installation site, by orienting the packing elements so as to place their major surfaces in vertical planes and with each of the packing elements being self supportable on a periphery thereof from which the bends extend in a substantially vertical direction, and by connecting the packing elements to one another to form a cohesive assembly thereof.

15. A packing element which is of an apertured sheet material and has actual width and length dimensions, and has an inclined surface with an angle of inclination which varies in a direction (D) corresponding to the width or length of the sheet such that the sheet has a profile width or profile length which is greater than its actual width or actual length, the packing element being characterised by its adaptation for use in the combination splash/trickle pack, a first region of the surface being sufficiently inclined to the horizontal to serve as a trickle surface and a second region of the surface being sufficiently close to the horizontal to serve as a splash surface, and wherein the inclined surface is a curved surface, the ratio (F) of profile length/actual length falls within the range 1.1 to 1.57 and the dimension of the packing element which determines its height in use is in the range of about 50 mm to about 300 mm, and wherein the sheet material has apertures with width and length dimensions of approximately 10 mm and 30 mm respectively to approximately 60 mm and 120 mm respectively.

16. A packing element as claimed in claim 15, wherein the ratio F falls within the range of about 1.2 to about 1.35.

17. A packing for an evaporative cooler, which has width, depth and height dimensions and includes stacked layers of packing elements of an apertured material, with the number of layers determining the height of the packing, the packing elements having actual width and length dimensions and being arranged such that the actual width, actual length and number of packing elements in each of the layers determines the width and depth of the packing, and packing elements in each of a plurality of the layers each has an inclined surface with an angle of inclination which varies in a direction (D) corresponding to the width or length of the sheet such that the element has a profile width or profile length which is greater than its actual width or actual length, the packing being characterized by its being a combination splash/trickle packing with said packing elements configured to provide in each of said plurality of layers, a first surface which is sufficiently inclined to the horizontal to serve as a trickle surface, and a second surface which is sufficiently close to the horizontal and sufficiently spaced from another packing element in a layer above it, to serve as a splash surface.

18. A pack for an evaporative cooler, which pack has width, depth and length dimensions and comprises packing elements of an apertured material which are arranged such that in use they form a stack of packing elements within the cooler, the number of packing elements determining the length of the pack, and the packing elements having actual width and length dimensions which determine the width and depth of the pack, said pack being characterised by its being a combination splash/trickle pack with each of a plurality of the packing elements having an inclined surface with an angle of inclination which varies in a direction (D) corresponding to the width or length of the element so that the element has a profile width or profile length which is greater than its actual width or actual length, and in use a first region of the surface is sufficiently inclined to the horizontal to serve as a trickle surface and a second region of the surface is sufficiently close to the horizontal and sufficiently spaced from another packing element which is above it in the stack, to serve as a splash surface, and said pack being further characterized by its being a unitary structure with the packing elements connected to one another so as to form a cohesive assembly thereof.

19. A pack for an evaporative cooler, which pack has width, depth and length dimensions and comprises packing elements of an apertured material which are arranged such that in use they form a stack of packing elements within the cooler, the number of packing elements determining the length of the pack, and the packing elements having actual width and length dimensions which determine the width and depth of the pack, said pack being characterized by its being a combination splash/trickle pack with each of a plurality of the packing elements having an inclined surface with an angle of inclination which varies in a direction (D) corresponding to the width or length of the element so that the element has a profile width or profile length which is greater than its actual width or actual length, and in use a first region of the surface is sufficiently inclined to the horizontal to serve as a trickle surface and a second region of the surface is sufficiently close to the horizontal and sufficiently spaced from another packing element which is above it in the stack, to serve as a splash surface, and said pack being further characterised by the ratio (F) of profile length to actual length falling within the range of about 1.1 to about 1.57, and adjacent packing elements are spaced apart at their furthest points from each other, a distance of about 75 mm to about 600 mm, and the apertured material has apertures with width and length dimensions of approximately 10 mm and 30 mm respectively to approximately 60 mm and 120 mm respectively.

20. A packing for an evaporative cooler, which has width, depth and height dimensions and includes stacked layers of packing elements of an apertured material, with the number of layers determining the height of the packing, the packing elements having actual width and length dimensions and being arranged such that the actual width, actual length and number of packing elements in each of the layers determines the width and depth of the packing, and packing elements in each of a plurality of the layers each has an inclined surface with an angle of inclination which varies in a direction (D) corresponding to the width or length of the sheet such that the element has a profile width or profile length which is greater than its actual width or actual length, the packing being characterized by its being a combination splash/trickle packing with said packing elements configured to provide in each of said plurality of layers, a first surface which is sufficiently inclined to the horizontal to serve as a trickle surface, and a second surface which is sufficiently close to the horizontal and sufficiently spaced from another packing element in a layer above it, to serve as a splash surface, the packing elements have apertures with width and length dimensions of approximately 10 mm and 30 mm respectively to approximately 60 mm and 120 mm respectively, and the packing elements in adjacent layers being vertically spaced apart at their furthest points, a distance of about 100 mm to about 600 mm.

* * * * *